(12) United States Patent
DiGregorio

(10) Patent No.: US 9,381,415 B1
(45) Date of Patent: Jul. 5, 2016

(54) SPORTS BALL COMMUNICATION SYSTEM

(71) Applicant: Ernest DiGregorio, Narragansett, RI (US)

(72) Inventor: Ernest DiGregorio, Narragansett, RI (US)

(*) Notice: Subject to any disclaimer, the term of this patent is extended or adjusted under 35 U.S.C. 154(b) by 0 days.

(21) Appl. No.: 14/101,635

(22) Filed: Dec. 10, 2013

Related U.S. Application Data

(63) Continuation-in-part of application No. 13/763,906, filed on Feb. 11, 2013, now abandoned.

(60) Provisional application No. 61/604,131, filed on Feb. 28, 2012.

(51) Int. Cl.
*A63F 9/24* (2006.01)
*A63B 69/00* (2006.01)
*A63B 24/00* (2006.01)

(52) U.S. Cl.
CPC ......... *A63B 69/0071* (2013.01); *A63B 24/0075* (2013.01)

(58) Field of Classification Search
CPC .................................................. A63B 69/0071
USPC ......................................................... 473/570
See application file for complete search history.

(56) References Cited

U.S. PATENT DOCUMENTS

| 4,858,920 | A | 8/1989 | Best | |
| 6,173,610 | B1 | 1/2001 | Pace | |
| 7,021,140 | B2 | 4/2006 | Perkins | |
| 7,234,351 | B2 | 6/2007 | Perkins | |
| 2007/0135243 | A1* | 6/2007 | LaRue et al. | 473/467 |
| 2008/0015061 | A1* | 1/2008 | Klein | 473/447 |
| 2009/0048044 | A1 | 2/2009 | Oleson et al. | |
| 2009/0210078 | A1 | 8/2009 | Crowley | |
| 2009/0325739 | A1 | 12/2009 | Gold | |
| 2010/0201500 | A1 | 8/2010 | Stirling et al. | |
| 2011/0130227 | A1* | 6/2011 | Chen | 473/450 |
| 2011/0304497 | A1* | 12/2011 | Molyneux et al. | 342/42 |
| 2013/0167290 | A1* | 7/2013 | Ben Ezra | 2/425 |

OTHER PUBLICATIONS

Zarda, Brett; "The Embeddable Coach: New Basketball's Built-In Sensor Tracks and Evaluates Players;" Jan. 21, 2011; http://www.popsci.com/technology/article/2011-01/tracking-basketball-players-sensor-embedded-ball.
"Smart Balls, Tracking Technology in Sports Coaching;" http://engineeringsport.co.uk/2011/01/27/smart-balls-tracking-in-sports-coaching; Jan. 27, 2011.
www.94fifty.com (technology and case study).

* cited by examiner

*Primary Examiner* — Steve Rowland
(74) *Attorney, Agent, or Firm* — Vincent G. LoTempio; Kloss, Stenger & LoTempio; David T. Stephenson

(57) ABSTRACT

A sports ball communication system includes a band that is to be worn by a participant who is meant to handle the sports ball; and a communication unit constructed and arranged to be worn by the participant on the band. The communication unit includes a main control unit, a memory for storing predetermined messages, and at least one sensor for sensing the actions of the ball by the participant. The system may include as sensors a microphone for sensing a bounce of the ball by the participant, and an accelerometer for sensing a motion of a ball handling hand of the participant.

20 Claims, 5 Drawing Sheets

SPORTS BALL COMMUNICATION SYSTEM

RELATED CASES

This application is a continuation-in-part (CIP) of U.S. Ser. No. 13/763,906 filed on Feb. 11, 2013 which is incorporated by reference herein in its entirety and which claims priority under 35 U.S.C. §119(e) to U.S. Provisional Patent Application No. 61/604,131 which was filed on Feb. 28, 2012 and which is incorporated by reference herein in its entirety.

FIELD OF THE INVENTION

The present invention relates to a sports ball communication system and more particularly such a system which includes but is not limited to a basketball but all sports balls. This system will include audio communication.

BACKGROUND OF THE INVENTION

The following are references that relate to the field of endeavor.

U.S. Publication No. 2009/0210078

This reference describes a computer-implemented athletic performance apparatus and method. The computer system employs data reflecting motion of a sporting device during one or more drills performed by an athlete. This system does not describe any real time feedback to the participant.

U.S. Publication No. 2009/0325739

This device is for providing information concerning the position and movement of a ball. This requires a very special purpose ball construction in that the ball requires an opening with a sensor board being positioned within the opening in the ball. Moreover, this system does not provide preferred real time audio feedback to the player.

U.S. Publication No. 2010/0201500

This reference discloses a system and method for providing measurement and analyzing movements of a body and for communicating information related to the body over a network. This system and method does not describe a control associated with the sports ball itself.

Accordingly, it is an object of the present invention to provide an improved sports ball communication system having a member that is disposed at the ball and that is sensable along with a communication unit at least portions of which are constructed and arranged to be worn by the user or player.

Another object of the present invention is to provide a sports ball communication system that provides, in real time, audio feedback to the user or player.

Still another object of the present invention is to provide a sports ball communication system particularly adapted for use with a sports ball and that senses the presence of the ball in the player's hand as well as the bouncing of the ball for, in turn, triggering an audio message heard by the player or user.

A further object of the present invention is to provide a sports ball communication system which, in addition to a member on or in the ball, there is provided a receiving device that is preferably attached to a limb of the player. This can thus be in the form of a band or strap that can be worn on the head, wrist, arm or leg.

SUMMARY OF THE INVENTION

To accomplish the foregoing and other objects, features and advantages of the present invention there is provided a sports ball communication system comprising: a member disposed at the ball and secured in a manner so that the presence of the member can be sensed; and a communication unit constructed and arranged to be worn by a user. The communication unit includes a main control unit, a memory for storing predetermined messages, and at least one sensor for sensing the ball in the hand of the user.

In accordance with other aspects of the present invention the member is contained on or in the ball; the member includes a resonant circuit and the sensor includes a receiver that is tuned to the same frequency as that of the resonant circuit; the member may comprise a magnetic strip on or in the ball and the sensor may comprise a magnetic sensor; the magnetic sensor may comprise a hall effect sensor; the communication unit also preferably includes an accelerometer for sensing a motion of the user's hand; and a microphone for sensing a bounce of the ball and a pre-amplifier for amplifying a signal detected by the microphone indicative of a bounce of the ball; the message is an audio message delivered through a speaker.

In another embodiment of the present invention there is provided a sports ball communication system for sensing the playing of a basketball by a player and in response thereto generating a predetermined audio message to assist in the performance of tasks with the basketball. The sports ball communication system includes a magnetic strip disposed on or in the basketball; an electronic processing unit for storing pre-selected messages; and a plurality of sensors that are constructed and arranged for wearing by the player. The sensors include a first sensor for detecting the proximity of the magnetic strip to thus positively identify the presence of the ball in the hand of the player, a second sensor for detecting the motion of the hand of the player, and a third sensor for detecting the bounce of the ball by the player.

In accordance with still other aspects of the present invention the first sensor comprises a hall effect sensor; the second sensor comprises an accelerometer for sensing a motion of the hand of the player; and the third sensor comprises a microphone for sensing the bounce of the ball; further including an output audio stage wherein the message is an audio message delivered through a speaker; and wherein the processing unit compares the sensed signals with a reference signal to determine authenticity.

In accordance with another embodiment of the present invention there is provided a method for sensing the playing of a basketball by a player and in response thereto generating a predetermined audio message to assist in the performance of tasks with the basketball. The method includes the steps of attaching a magnetic strip onto or in the basketball; storing pre-selected messages; and providing a plurality of sensors that are constructed and arranged for wearing by the player and including; making a first sensing for detecting the proximity of the magnetic strip to thus positively identify the presence of the ball in the hand of the player, making a second sensing for detecting the motion of the hand of the player, and making a third sensing for detecting the bounce of the ball by the player. The method may further include generating an audio message based on the sensed signals, and comparing the sensed signals with a reference signal to determine authenticity.

In accordance with a more simplified embodiment of the present invention there is provided a sports ball communication system that includes a band that is to be worn by a participant who is meant to handle the sports ball; and a communication unit constructed and arranged to be worn by the participant on the band. The communication unit includes a main control unit, a memory for storing predetermined messages, and at least one sensor for sensing the actions of the ball by the participant. In a preferred embodiment the at least one sensor comprises a microphone for sensing a bounce of the ball by the participant, and an accelerometer for sensing a motion of a ball handling hand of the participant. The communication unit comprises an enclosure for housing the microphone and the accelerometer. A speaker is supported at the band, the speaker for providing audio messages stored in the memory to the participant based upon the detection of signals from the microphone and accelerometer. In still another embodiment of the present invention there is provided a sports ball communication system for sensing the playing of a basketball by a player and in response thereto generating a predetermined audio message to assist in the performance of tasks with the basketball. The sports ball communication system comprises:

a band that is to be worn by a participant who is meant to handle the sports ball;

an electronic processing unit for storing pre-selected messages;

a plurality of sensors that are constructed and arranged for wearing by the player and including;

a first sensor for detecting a motion of the ball in the hand of the player, and a second sensor for detecting the bounce of the ball by the player.

In accordance with still a further embodiment of the present invention there is provided a method for sensing the playing of a basketball by a player and in response thereto generating a predetermined audio message to assist in the performance of tasks with the basketball, the method comprising the steps of:

providing a band that is to be worn by the player;

storing pre-selected messages in a memory; and providing a plurality of sensors that are constructed and arranged for wearing by the player and including;

making a first sensing for detecting a motion of the ball in the hand of the player, and making a second sensing for detecting the bounce of the ball by the player.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

The system of the present invention, in accordance with one embodiment thereof provides a new and novel way to enjoy the game of basketball by using a basketball that has a bounce sensor. Special electronics, disposed in a receiving device senses the bounce or proximity of the basketball and triggers a voice recording which can be heard by the player or user. The receiving device attaches to an appendage of the body by means of a band or strap. For example: head, wrist, arm, leg, etc. The user hears entertaining comments from the receiving device or other recordings triggered by their interaction with the ball. Although the concepts of the present invention are primarily described in association with a basketball, it is understood that the principles of the present invention may also apply to other types of sports balls.

The basketball electronics, in one embodiment thereof, is entirely passive, and can either be incorporated into the basketball construction when built or added to the ball by the user by placing a magnetic strip (the transmitter) on an outer surface of the ball. Any such circuit is preferably small, light, and flexible enough so as not to disturb the perceived physical characteristics of the ball. It can be in the form of a stick-on flexible patch or glued to the ball by the manufacturer so as to customize the ball.

The receiver electronics consist of at least a battery, a transducer to receive the information from the ball; a control device to determine the ball bounce, the number of bounces, amplifier and speaker to make the voice recording audible in a noisy environment.

Figure 1:
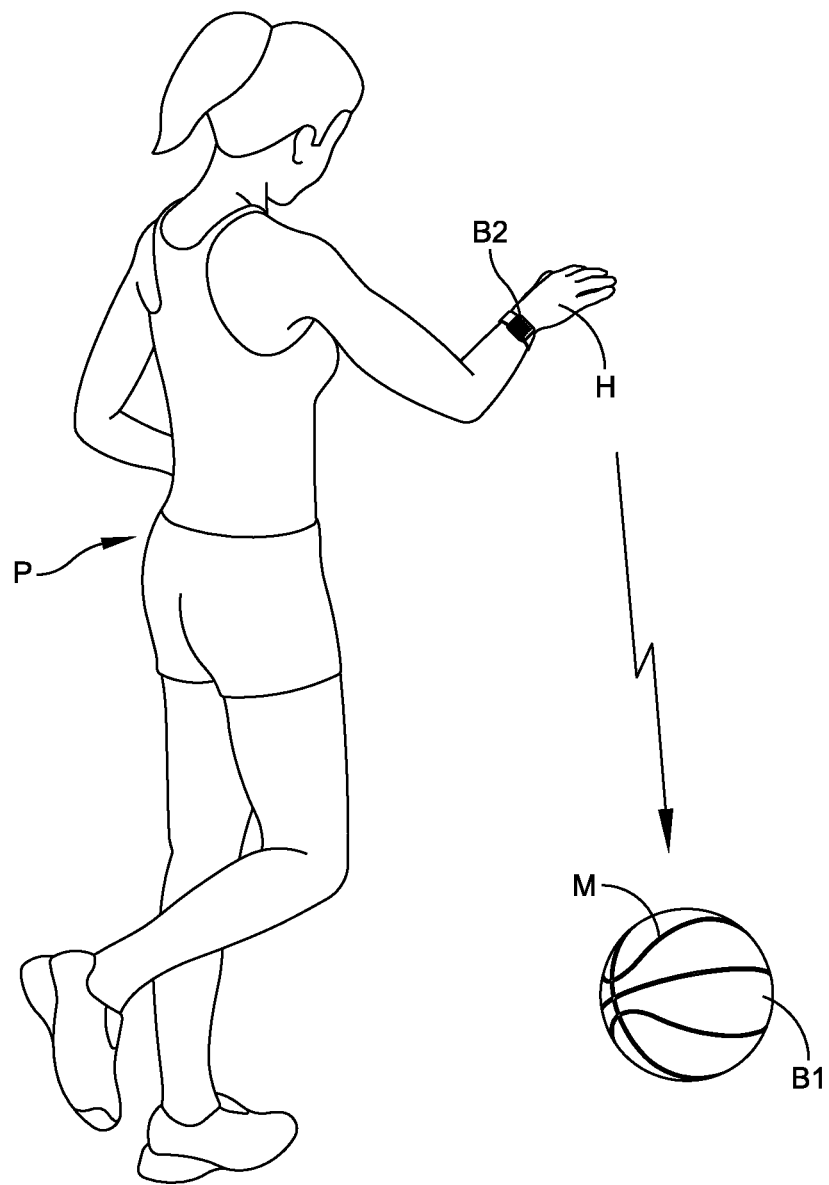
FIG. 1 is a schematic illustration of the sports ball and sensor.

Reference is now made to FIG. 1 which is a schematic illustration showing the player P having a hand H for manipulating the ball B1. FIG. 1 also illustrates a band B2.

A regulation (or non regulation) ball such as a basketball outfitted with a smart sensor package (such as accelerometers and audio devices) either internal or external or within wireless range. RFID, short range of infrared range of the ball, would enable an enjoyable and educational experience for the player. The ball will be the source of funny, instructional and educational audio clips for players of all ages. New and innovative educational applications are being added as enrichment features to many middle school and high school curriculums because they are very effective. According to standardized testing, students learn more and retain this information for longer periods of time when such entertainment solutions are added into the curriculum.

This spoken content can be stored, transmitted in real time or downloaded periodically from, for example, a sports figure's website. This site will be the command and control portal for parents, teachers, coaches and players. Content will be vetted by athletes, teachers and parents to create a positive experience for the participant. Standard content will be refreshed frequently. This content can be delivered in a variety of voices, accents, and languages that can span the spectrum from a trash talking wise guy to an Ambassador at the United Nations. The content can be delivered by a wide variety of historical figures. For example: Thomas Jefferson could give a history lesson or Abe Lincoln could give his Gettysburg address. The player's coach could give instructional pointers for the player.

Coaches are very committed to their students but their time limited. The talking ball can record and archives play and practice sessions which the coach can later download and use to create a customized practice session. In accordance with the invention the system is manufactured using the best practices available. The approach is to completely preserve the integrity of the ball relative to balls used in regulation play. It will feel, function and respond the same as any other ball would to the player.

In summary, the sports ball communication system of the present invention will be a truly unique and revolutionary system which will provide a novel approach to incorporating a fun, educational, and instructional experience for player, parent and coach by merging a popular sports activity with learning.

Figure 2:
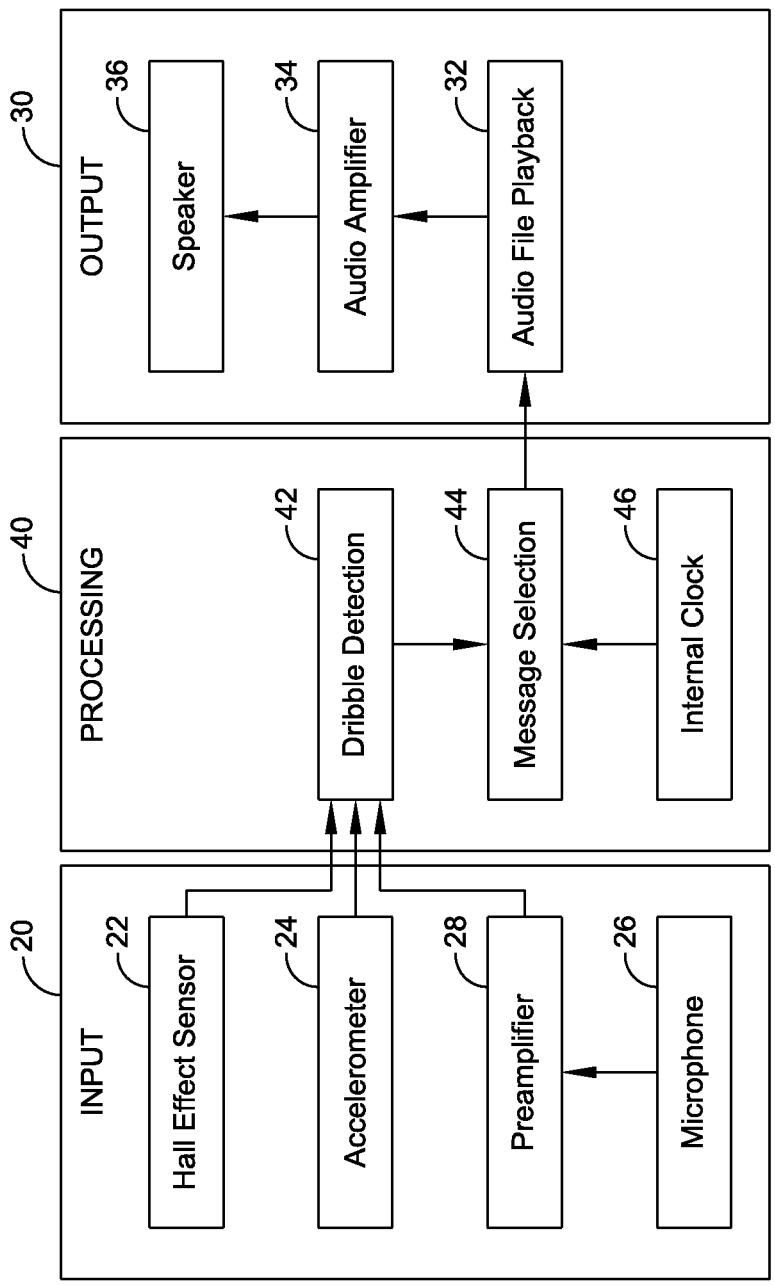
FIG. 2 is a block diagram of a preferred version of the present invention.
Figure 3:
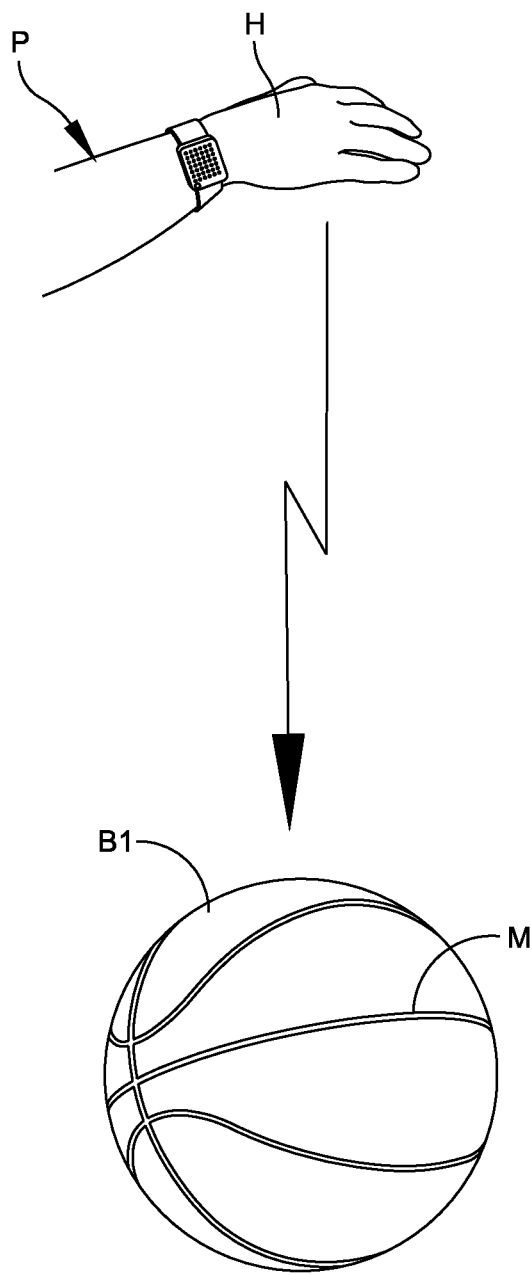
FIG. 3 is an illustration of the system associated with the block diagram of FIG. 2 illustrating the use of a member on the outer surface of the ball preferably in the form of a magnetic strip.

Reference is now made to a preferred embodiment of the present invention illustrated in FIGS. 2 and 3.

One objective of the present invention is to develop a small, wearable, real-time computer system that can offer pre-programmed and recorded feedback to the user who is practicing the game of basketball or other sports that require the use of a ball. The system would also have an internal real time clock. The system will also provide pre-programmed audio messages. The system will have a memory to store pre-recorded audio files, which will be played back (under computer control) to the participant.

The system will use three environmental sensors, plus an internal real time clock, to gather the data required to drive a finite state machine that will select feedback messages that are appropriate. The microcontroller system on board the system will be equipped with real time signal processing code. Furthermore, the onboard flash memory will be used to store reference data for use in comparison and pattern matching algorithms.

With further specific reference to FIG. 2, there is shown the basic computer system that is separated into three categories, an input section 20, an output section 30 and a processing section 40. As will be described in further detail hereinafter, the input section represents basically three different sensor arrangements for sensing the use and bouncing of the ball. This includes a hall effect sensor 22, an accelerometer 24 and a microphone 26 with associated pre-amplifier 28. These various devices shown at the input section 20 coupled to the processing section 40. The processing section 40 includes dribble detection 42, message selection 44 and an internal clock 46. The output from the message selection box 44 couples to the output section 30. The output section 30 includes an audio file playback box 32, an audio amplifier 34 and a speaker 36.

FIG. 3 illustrates the player P bouncing the ball B1. FIG. 3 also illustrates the use of a magnetic strip M that is preferably disposed about the ball B1 but may also be provided on an internal surface of the ball. The magnetic strip M may simply follow the normal markings on a conventional basketball which is provided with certain loop designs slightly recessed. The magnetic strip may be disposed in that recess. The function of the magnetic strip is discussed hereinafter.

As indicated previously, there are preferably three sensors used in association with the preferred system of the present invention for detecting the presence of the ball in the player's hand as well as the bounce of the ball and the rhythm of the bounce. The first sensor is the hall effect sensor 22, which will senses magnetic fields. A major goal of this invention is to avoid putting any active electronics on the basketball itself. The ability to positively identify the ball's presence, using a test that is both highly sensitive and specific, is desired to minimize errors. Magnetism is preferred since the basketball will not be played in any environment with high ambient magnetic fields. A magnetized adhesive tape is attached to the basketball and is sensed by the receiving controller device (head band, wrist band, arm sleeve, etc.). This basketball or any other ball may have the tape integrated with printed graphics that would uniquely identify the ball and have the potential to create a value added effect. The hall effect sensor 22 requires some support circuitry. The sensor produced an analog output that is proportional to the sensed magnetic field. Refer also to FIGS. 4A-4D and, in particular, FIG. 4D that shows the position of the hall effect sensor 22. In the preferred embodiment, the sensor arrangement is disclosed in a wrist band including the strap 50 described in further detail hereinafter. In this way the hall effect sensor 22 is in sufficient proximity to the ball and magnetic strip M for sensing that the ball has been placed in the players hand The second sensor is an accelerometer 24 mounted on the main circuit board. The accelerometer is used to sense the motion of the player's hands. The selected accelerometer communicates via a digital link (over the microcontroller's SPI bus). This results in a considerable simplification of the analog-to-digital systems as all three axis will be available without requiring ADC's for each channel. The accelerometer 24 does not require any analog support circuitry.

The final sensor is the microphone 26 mounted inside the main enclosure. This is used to detect the final "bounce" of a dribbled basketball. Signal conditioning and pattern identification is handled as part of the overall data processing algorithms. The microphone is preferably a small electric-type that will offer reasonable sensitivity across the low frequencies. Furthermore, a low pass filter that operates below 500 Hz can be used. In addition to filtering the detected "bounce" signal, and as illustrated in FIG. 2, there is preferably a pre-amplifier 28 for coupling the detected signal to the processing unit 40.

Reference is now made to FIGS. 4A-4D for an illustration of the communication unit in accordance with the present invention that is preferably worn on the wrist, although, it may be worn on other extremities of the player's anatomy or at other locations of the anatomy. The use on the wrist is preferred as that provides for optimum coupling of the hall sensor signal relative to the magnetic strip on the basketball. Thus, FIGS. 4A-4D illustrate the communication unit C.

Figure 4C:
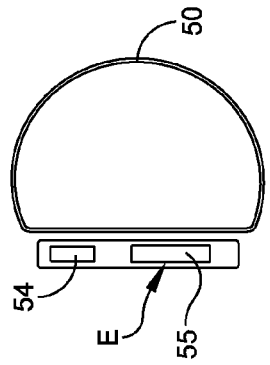
FIGS. 4A-4D illustrate various views of the communication unit.
Figure 4D:
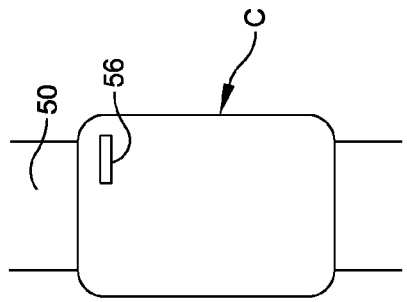
Figure 4A:
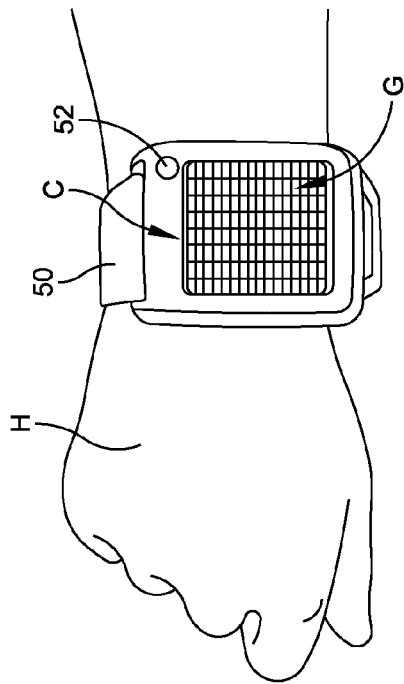

FIG. 4A illustrates a communication unit as secured about the wrist of the participant. FIG. 4A also illustrates the grill G of the speaker and a power light 52 which is an indication as to whether the unit is turned on or not.

Figure 4B:
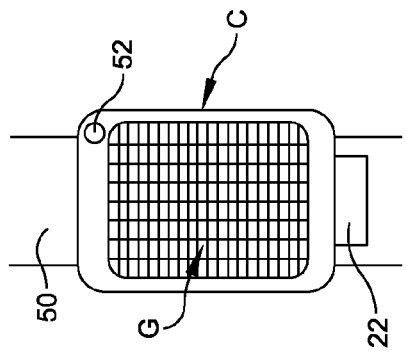

FIG. 4B also illustrates the communication unit C, the strap 50 and the speaker grill G. FIG. 4B also shows the placement of the hall effect sensor 22. FIG. 4C is a side view illustrating the strap 50 as well as the enclosure E inside of which is disposed at least the majority of the components illustrated in FIG. 2. FIG. 4C also illustrates an on/off switch 54 and a volume control 55.

Finally, FIG. 4D is a rear view of the communication unit C illustrating a USB port 56. The USB port 56 can be used for charging batteries in the unit and also as a communication link for updates regarding audio messages to be generated.

Project Hardware

The main controller (dribble detector 42) may be an Atmel ATMega 2560 MCU or equivalent that provides analog to digital conversion, flash memory, and enough speed such that data processing could be done at a reasonable rate. The system provides a reasonable amount of RAM, which could be expanded if necessary. The MCU offers a variety of peripheral buses. The SPI bus can be used to connect the Kionix accelerometer. The MCU also offers an I2C bus, which will be useful for connecting an external DAC or additional RAM or flash memory.

The hall effect sensor 22 requires some processing. Notably, the sensor does have an offset voltage. This can be subtracted in hardware, alternatively, the raw signal will be put into one of the ADC inputs on the MCU. In this case, the subtraction will be done in software. The threshold function will also be done in software—the Atmel MCU provides an interrupt that will fire if the ADC's register value exceeds a predetermined threshold.

Microphone: Since it is a wideband analog signal, proper low-pass filtering is required to avoid aliasing. A four state RC low pass filter is used as an op amps. The audio signal only requires 500 Hz of bandwidth, and therefore, the LPF is set at 500 Hz. A 1.0 to 1.2 kHz sampling rate is required to avoid using excessive amounts of space in RAM.

The comparison algorithms developed requires reference values to be stored in flash memory. It is likely that an external flash chip will be required to store enough audio data so that user prompts may also be saved. Using the mu-law encoding format, audio with a bit depth of 8 bits and a sampling rate of 8 kHz will be stored at a bit rate of 64 kpbs. This will provide telephone-quality audio to the user. The mu-law companding algorithm will allow for an effective bit depth of 14 bits after de-companding.

Algorithms Developed

The hall effect sensor is a very simple input to decode-there is merely a binary signal, which states whether the ball is in hand or not. However, the microphone and accelerometer both provide far more complex signals. In order to determine whether an event of interest has happened, we compare them to a library of events. In this way, we have a simple algorithm, which will not require much CPU power to run.

It is preferred that the system have a large (dozens to hundreds of samples) library of events of interest—for the microphone, the sound of a ball bounding, and for the accelerometer, the motion of the hand dribbling a basketball. These samples were brought into the MATLAB environment to enable rapid prototyping and testing of the algorithms. We used the z-axis of the accelerometer for all of our data recording.

The first step is to use a comparison. We found that by comparing the samples to a known reference, we eliminate a large amount of background noise. Furthermore, this allows us to scale our input signal to the reference. We determined that the peak value of the reference signals will be scaled to exactly 1. Therefore, we will then scale the peak value of the input signal so that it is also 1, which will make further comparisons more accurate. Since we must have the entire input signal buffered, this is not a true real time algorithm.

During the next step a more detailed comparison between the input and reference pulses was made. We began using correlation coefficient measurements to reduce the comparison to a single number. We first tried the r-squared metric since it is very simple to implement and is easy to interpret. We found that the r-squared metric was about 70% accurate at identifying events. We would improve detection by adding different correclection metrics, and considering the average of them all.

We also began to develop a scoring system. Each category, from the threshold detection, to the correlation measurements, would be worth a certain number of points. For instance, the threshold could be worth 50. The r-squared value could account for up to 25 points (with a perfect value of r-squared=1.00), and another metric could account for the remaining 25. As an example, we would interpret anything over a score of perhaps 65 as an event of interest. Note that the same algorithm can be used for the microphone and the accelerometer, the only thing that need be changed is the reference values.

State Machine Developed

A sequence of events was identified that will be used to characterize a dribble. This can be expressed as a multi-step process in which each step is to be completed in turn.

1. Player must have ball in hand (hall effect sensor detects magnetic strip)
2. Player dribbles (sense motion from accelerometer)
3. Time delay of ball traveling to the ground
4. Bouncing sound from ball (sense from microphone)

In order for a full sequence to be completed, each of these steps occurs in order. This is also a way for us to filter out false positives. Even if the player makes a dribbling motion, if they do not have the ball in their hands, we can discount that event as noise. The overall timing of this sequence is important. We can take advantage of the highly predictable timing to lower the overall error of the system by eliminating events that are obviously false positives. This also underscores the need to have some sort of object on the basketball that will uniquely identify it. The magnetic tape was selected as a cheap, easy-to-implement option.

However, we have only so far described a state machine to detect a dribble. Dribble detection should be incorporated into the overall state machine that is charged with selecting and playing appropriate feedback messages. One method of implementing this system would be to provide dribble detection as a library function. The user would program the system by writing a main event loop that would be running continuously on the MCU. This program would take advantage of library functions to detect dribbles and keep track of the time, amongst others. This would allow the programmer to develop rules by which feedback messages would be selected.

Summary Features

1. The system will be attached to the user.
2. The system will be battery powered (Nano preferred).
3. The system will provide pre-recorded audio feedback messages to the user.
4. The system will select messages based upon a pre-programmed state machine.
5. The system will contain an internal real time clock.
6. The system will utilize a variety of sensor mechanisms to observe the external environment.
7. The system will be able to function in the presence of interference.
8. The system will utilize a microphone, a hall effect sensor, and an accelerometer to gather data from the world.
9. The system will not require any electronics to be mounted on the basketball.
10. The system will use a magnetized tape strip to be mounted on the basketball.
11. The system will have an onboard microcontroller to do data processing and run the state machine.
12. The system will have a speaker to produce audio feedback.
13. The system will have the ability to communicate via USB with a computer or external website to down load audio files.
14. The controller system will be housed in an enclosure which will attach to the extremities of the human body.
15. The system will have the ability to communicate via a storage device (example SIMS card), computer and/or website to download instructional files.

Figure 5:
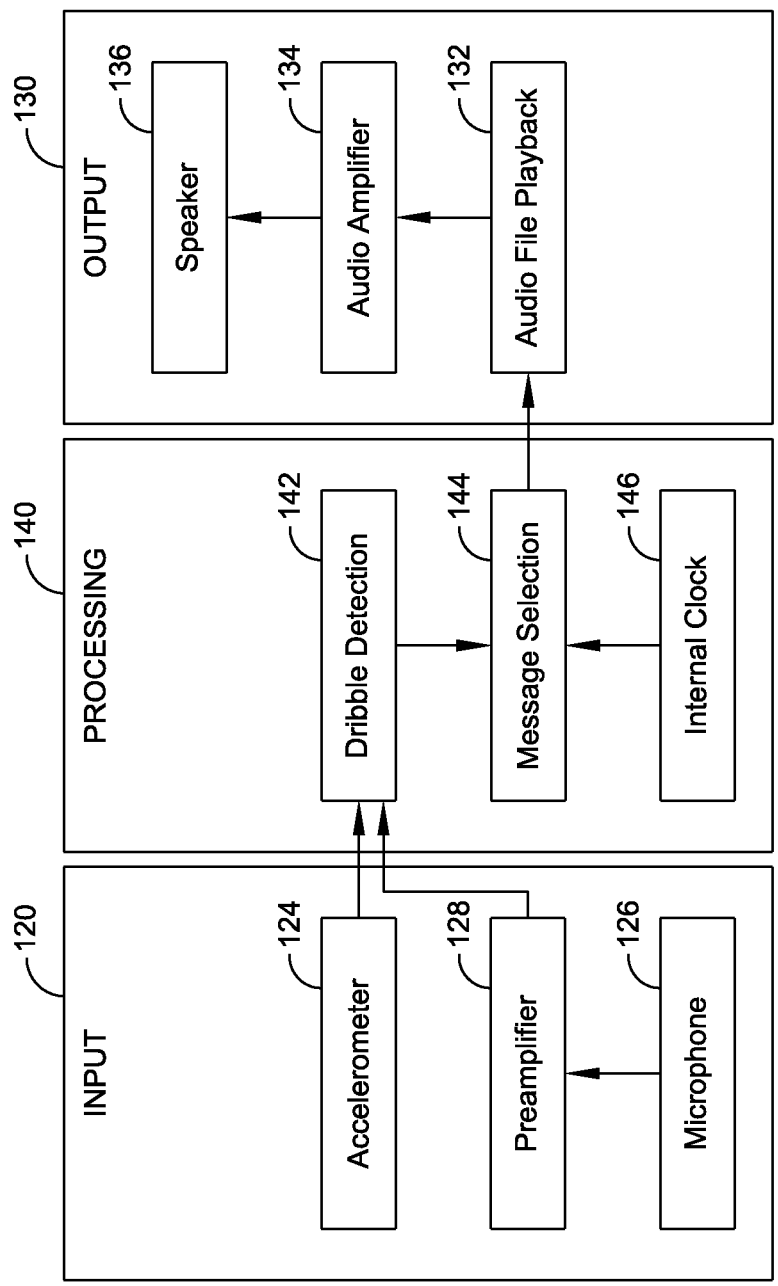
FIG. 5 is a system diagram of an alternate embodiment of the invention.

With further specific reference to FIG. 5, there is shown a simplified version of the present invention including a computer system that is separated into three categories, an input section 120, an output section 130 and a processing section 140. As will be described in further detail hereinafter, the input section represents basically two different sensors for sensing the use or movement of the ball and secondly the bouncing of the ball. This includes an accelerometer 124 and a microphone 126 with associated pre-amplifier 128. These various devices, shown at the input section 120, connect to the processing section 140. The processing section 140 includes dribble detection 142, message selection 144 and an internal clock 146. The output from the message selection box 144 couples to the output section 130. The output section 130 includes an audio file playback box 132, an audio amplifier 134 and a speaker 136.

As indicated previously, in this simplified version of the invention there are basically two sensors used for detecting the motion of the ball by the player's hand as well as the bounce of the ball and the rhythm of the bounce. One of the sensors is an accelerometer 124 mounted on the main circuit board. The accelerometer is used to sense the motion of the player's hands. The selected accelerometer communicates via a digital link (over the microcontroller's SPI bus). This results in a considerable simplification of the analog-to-digital systems as all three axis will be available without requiring ADC's for each channel. The accelerometer 124 does not require any analog support circuitry.

In this simplified version, the other sensor is the microphone 126 mounted inside the main enclosure. This is used to detect the final "bounce" of a dribbled basketball. Signal conditioning and pattern identification is handled as part of the overall data processing algorithms. The microphone 126 is preferably a small electric-type that will offer reasonable sensitivity across the low frequencies. Furthermore, a low pass filter that operates below 500 Hz can be used. In addition to filtering the detected "bounce" signal, and as illustrated in FIG. 5, there is preferably a pre-amplifier 128 for coupling the detected signal to the processing unit 140.

In accordance with aspects of the present invention, the manipulation of the basketball works in close concert with the wrist band or head band. Based on a predetermined number of bounces of the ball, the system controller (processing section 140 in FIG. 5) generates random audible instructions (message selection 144 in FIG. 5) preferably from favorite players or coaches which are transmitted to the user via onboard speakers at the wrist or head band. The "bounce" detection may detect the frequency of the bounces or possibly the magnitude or delay intervals of the bounces. This is detected primarily by the microphone. In addition the accelerometer sensor detects, not only the bounces, but also the hand motion of the player, by virtue of the accelerometer being mounted with the band (whether a wrist band, head band or any other device mounted on the body). The accelerometer is preferably mounted with a wrist band as that provides a direct correlation between hand motion and the ball itself.

The system of the present invention interrogates all the sensor data via microphone and in conjunction with an accelerometer and will make a decision based upon the number of recorded bounces of the ball or movements of the appendage (hand). The raw sensor data is translated into 'verbs' appropriate for describing state transitions in the programming infrastructure that controls user feedback. The data is processed and used to advance the 'state' of the system that decides which voice recording to play to the user (player). The system of the present invention can also include a voice recognition device taking input audio messages from the player into the processor so as to effect instructions provided via the memory that stores instruction messages.

The controller in accordance with the present invention also has the ability to support wireless communication with other receiving devices, including but not limited to ear buds and remote speakers.

Having now described a limited number of embodiments of the present invention, it should now be apparent to those skilled in the art that numerous other embodiments and modifications thereof are contemplated as falling within the scope of the present invention, as defined by the appended claims. For example, the basketball is described as having a magnetic strip disposed thereabout. Other techniques can be used for applying a magnetic piece to the ball.

What is claimed is:

1. A sports ball communication system comprising: a band that is to be worn by a participant who is meant to handle a sports ball; and a communication unit constructed and arranged to be worn by the participant on the band; the communication unit including a main control unit, a memory for storing predetermined messages, and at least one sensor for sensing the actions of the ball by the participant; wherein a first sensor comprises a microphone for detecting a contact of the sports ball with an object of interest, wherein the communication unit comprises an enclosure for housing the microphone; wherein detection of the contact of the sports ball with the object of interest will be determined by sampling a microphone signal, wherein the microphone signal is converted to digital form at a minimum sampling rate of 1 to 2 KHz; wherein the microphone signal is passed through a low pass filter.

2. The sports ball communication system of claim 1 wherein the low pass filter for the microphone is set at 500 Hz.

3. The sports ball communication system of claim 2 wherein the at least one sensor also includes an accelerometer for sensing a motion of a ball handling hand of the participant.

4. The sports ball communication system of claim 3 wherein the communication unit comprises an enclosure for housing the microphone and accelerometer.

5. The sports ball communication system of claim 4 further including a speaker supported at the band, the speaker for providing audio messages stored in the memory to the participant based upon the detection of signals from the microphone and accelerometer.

6. The sports ball communication system of claim 5 wherein the communication unit also includes an accelerometer for sensing a motion of the user's hand.

7. The sports ball communication system of claim 1 wherein the at least one sensor includes an accelerometer for sensing a motion of a ball handling hand of the participant.

8. The sports ball communication system of claim 7 further including a speaker supported at the band, the speaker for providing audio messages stored in the memory to the participant based upon the detection of signals from the accelerometer.

9. A sports ball communication system for sensing the playing of a basketball by a player and in response thereto generating a predetermined audio message to assist in the performance of tasks with the basketball, the sports ball communication system comprising:
a band that is to be worn by a participant who is meant to handle the sports ball;
an electronic processing unit for storing pre-selected messages;
a plurality of sensors that are constructed and arranged for wearing by the player and including;
a first sensor for detecting a motion of the ball in the hand of the player, and a second sensor for detecting the bounce of the ball by the player; wherein the second sensor comprises a microphone for sensing a basketball bounce, wherein the communication unit comprises an enclosure for housing the microphone; wherein recognition of the basketball bounce will be determined by sampling a microphone signal, wherein the microphone signal is converted to digital form at a minimum sampling rate of 1 to 2 KHz; wherein the microphone signal is filtered by a low pass filter;
wherein the microphone signal is compared to a pre-built library of known basketball bounce audio patterns; and wherein a correlation between microphone signal and the pre-built library results in a variable which is used to authenticate the signal as a basketball bounce.

10. The sports ball communication system of claim 9 wherein the electronic processing unit includes a memory for storing pre-selected messages.

11. The sports ball communication system of claim 9 including an output audio stage wherein the message is an audio message delivered through a speaker.

12. A method for sensing the playing of a basketball by a player and in response thereto generating a predetermined audio message to assist in the performance of tasks with the basketball, the method comprising the steps of:
  providing a band that is to be worn by the player;
  storing pre-selected messages in a memory; and providing a plurality of sensors that are constructed and arranged for wearing by the player and including;
  making a first sensing for detecting a motion of the ball in the hand of the player, and making a second sensing for detecting the bounce of the ball by the player;
  wherein the second sensor comprises a microphone for sensing a basketball bounce, housing the microphone within an enclosure in a communication Unit;
  recognizing the basketball bounce by sampling a microphone signal, wherein the microphone signal is converted to digital form at a minimum sampling rate of 1 to 2 KHz; and
  filtering the microphone signal with a low pass filter;
  wherein the microphone signal is compared to a pre-built library of known basketball bounce audio patterns; wherein a correlation between the microphone signal and the pre-built library results in a variable which is used to authenticate the microphone signal as a basketball bounce.

13. The method of claim 12 including generating an audio message based on the sensed signals.

14. The method of claim 12 including comparing the sensed signals with a reference signal to determine authenticity.

15. The method of claim 12 including assigning a number of points to a plurality of categories; wherein a first category is threshold detection, wherein a second category is correlation measurements;
  wherein a threshold value is set at a predetermined value;
  calculating an r-squared value;
  assigning a maximum number of points for the r-squared value; wherein a perfect value of r-squared is equal to 1.00;
  determining an additional metric and assigning points to the additional metric to account for a remaining score; and
  authenticating the microphone signal as the basketball bounce when the total number of points assigned to the microphone signal exceed a predetermined number of points.

16. The method of claim 12 including wherein the low pass filter is set to 500 Hz.

17. The sports ball communication system of claim 9 wherein the low pass filter is set to 500 Hz.

18. The sports ball communication system of claim 9 wherein the microphone signal will be converted by microprocessor digital signal processing to a frequency domain representation via fast Fourier transform resulting in a spectrogram that is then compared to a pre-built library of known basketball bounce spectrogram patterns.

19. The sports ball communication system of claim 1 wherein the sports ball is a basketball and the object of interest is a floor.

20. The sports ball communication system of claim 1 wherein the microphone signal is compared to a pre-built library of known sports ball contact audio patterns; and wherein a correlation between the microphone signal and the pre-built library results in a variable which is used to authenticate the signal as the contact of the sports ball with the object of interest.

\* \* \* \* \*